(12) United States Patent
Lind et al.

(10) Patent No.: US 10,132,413 B2
(45) Date of Patent: Nov. 20, 2018

(54) GAS INLET VALVE WITH INCOMPATIBLE MATERIALS ISOLATION

(71) Applicant: Lam Research Corporation, Fremont, CA (US)

(72) Inventors: Gary Bridger Lind, Nevada City, CA (US); Panya Wongsenakhum, Santa Clara, CA (US)

(73) Assignee: Lam Research Corporation, Fremont, CA (US)

( * ) Notice: Subject to any disclaimer, the term of this patent is extended or adjusted under 35 U.S.C. 154(b) by 53 days.

(21) Appl. No.: 15/139,221

(22) Filed: Apr. 26, 2016

(65) Prior Publication Data

US 2016/0319938 A1 Nov. 3, 2016

Related U.S. Application Data

(60) Provisional application No. 62/154,517, filed on Apr. 29, 2015.

(51) Int. Cl.
| | |
|---|---|
| *F16K 1/32* | (2006.01) |
| *G05D 7/00* | (2006.01) |
| *F16K 51/00* | (2006.01) |
| *F16K 31/122* | (2006.01) |

(52) U.S. Cl.
CPC ............... *F16K 1/32* (2013.01); *F16K 51/00* (2013.01); *G05D 7/00* (2013.01); *F16K 31/122* (2013.01); *F16K 31/1221* (2013.01)

(58) Field of Classification Search
USPC .............................................. 251/61.4, 63.3
See application file for complete search history.

(56) References Cited

U.S. PATENT DOCUMENTS

| | | | | |
|---|---|---|---|---|
| 5,379,982 A | * | 1/1995 | Koyomogi | ................ F16K 1/10 137/375 |
| 8,196,893 B2 | * | 6/2012 | Grout | ........................ F16K 1/36 137/375 |
| 2013/0181155 A1 | * | 7/2013 | Robison | .................... F16K 5/08 251/324 |
| 2014/0109973 A1 | * | 4/2014 | Neumeister | ............. F16K 41/10 137/1 |

OTHER PUBLICATIONS

Novellus, XL*, High Vacuum Angle Valve, Air Operated, Lam Research, DOC-3076a, Document Control Released Oct. 25, 2012, 5 pages.

* cited by examiner

*Primary Examiner* — John K Fristoe, Jr.
*Assistant Examiner* — Daphne M Barry
(74) *Attorney, Agent, or Firm* — Weaver Austin Villeneuve & Sampson LLP (57) ABSTRACT

A gas inlet valve with incompatible materials isolation is provided. The valve may include a piston that seals against a surface when in a closed position and that permits gas to flow through the valve and out the outlet port when in an open position. A bellows may protect the actuation mechanism of the piston from gas that may be present in the valve when the valve is in the open or closed position, and the piston may include a second seal interface that seals the bellows off from the gas flow area when the valve is in the open or closed position.

21 Claims, 12 Drawing Sheets

GAS INLET VALVE WITH INCOMPATIBLE MATERIALS ISOLATION

CROSS REFERENCE TO RELATED APPLICATIONS

This application claims benefit of priority under 35 U.S.C. § 119(e) to U.S. Provisional Application No. 62/154,517, filed on Apr. 29, 2015, which is hereby incorporated by reference herein in its entirety.

BACKGROUND

A range of gases, each with differing chemical and physical properties, may be used in various semiconductor manufacturing operations. Accordingly, a variety of valves may be used to regulate gas flow in such operations.

SUMMARY

In one embodiment, a valve configured to regulate gas flow to a semiconductor manufacturing apparatus may be provided. The valve may include a body that includes a cavity at least partially bounded by an interior surface of the body, and at least one inlet port, wherein the at least one inlet port is fluidically connected with the cavity. The valve may also include a bellows sealed to a first portion of the interior surface of the body and a piston assembly at least partially located within the body and movable between an open configuration and a closed configuration, such that when the piston assembly is in at least the open configuration, a portion of the piston assembly seals a portion of the cavity containing the bellows off from another portion of the cavity in fluidic communication with the at least one inlet port.

In one embodiment, the piston assembly may include a piston that includes a first seal interface and a second seal interface configured to seal against a second portion of the interior surface of the body to protect the bellows from exposure to process gases introduced into the cavity via the at least one inlet port when the piston assembly is in at least the open configuration. The piston assembly may also include a rod; the bellows may seal the rod from fluidic communication with the second seal interface, the rod may be slideably connected with the body and configured to allow the piston to translate along a first axis, and the first seal interface may be substantially perpendicular to the first axis.

In some such embodiments, when the piston assembly is in the closed configuration, the portion of the cavity containing the bellows may not be sealed off from the other portion of the cavity that is in fluidic communication with the at least one inlet port, the bellows may seal the rod from fluidic communication with the at least one inlet port, the first seal interface and the second seal interface may face in opposite directions, and the first seal interface and the second seal interface may be substantially perpendicular to the first axis.

In some other embodiments, when the piston assembly is in the open and in the closed configurations, the portion of the piston assembly may seal a portion of the cavity containing the bellows off from another portion of the cavity in fluidic communication with the at least one inlet port, and the second seal interface may be further configured to seal against the second portion of the interior surface of the body when the piston assembly is in the open configuration, in the closed configuration, and between the open and closed configurations.

In some such embodiments, the second seal interface may be substantially parallel to the first axis.

In one such embodiment, the piston may further include a removable seat that includes the first seal interface.

In some such embodiments, the removable seat may be configured to be removed from the piston.

In one such embodiment, the removable seat may include a first seal and a seat body with a face, and the face and the first seal may be configured to seal against the body or a mounting surface to which the valve is mounted.

In one such further embodiment, the seat body may be composed of a ceramic, and the piston may be composed of a material such as aluminum or an aluminum alloy.

In some such further embodiments, the removable seat may be inserted into a cavity of the piston that includes a recessed area that is sized larger than a diameter of the removable seat; the piston and the removable seat, when assembled, may form a gland that receives the first seal; a first sidewall of the gland may be provided by the piston and may be made of aluminum of an aluminum alloy; and a second sidewall of the glad may be provided by the removable seat and may be made of a ceramic material.

In some such embodiments, the first seal may encircle the face when viewed from an angle perpendicular to the face.

In some such embodiments, the first seal interface may be configured to seal against the body.

In some embodiments, the first seal interface may be configured to seal against a mounting surface wherein the valve is mounted to the mounting surface.

In one such embodiment, the piston may include a circumferential groove.

In some such embodiments, the circumferential groove may have a semi-circular cross-sectional shape.

In some such embodiments, the circumferential groove may be positioned on the piston such that when the piston assembly is in the open configuration, the groove is substantially aligned with the at least one inlet port along the first axis.

In some such embodiments, a width of the circumferential groove may be within 15% of a maximum diameter of the at least one inlet port.

In some embodiments, a minimum distance between the piston and the interior surface of the body in a plane perpendicular to the first axis may vary about the perimeter of the piston.

In some embodiments, the piston may have a circular cross-sectional shape in a plane perpendicular to the first axis, and a bore region of the interior surface of the body may have a cross-sectional shape in the plane perpendicular to the first axis such as a circular cross-sectional shape, an ovular cross-sectional shape, an elliptical cross-sectional shape, or an obround cross-sectional shape.

In one embodiment, the valve may further include a seal plate with an exterior surface, such that the exterior surface is composed primarily of a ceramic material, and the piston assembly is configured to seal to the seal plate.

In some such embodiments, the seal plate may be configured to seal directly to a gas distribution manifold.

In some embodiments, the bellows may be composed primarily of stainless steel.

These embodiments are not limiting, and the full scope of the disclosure is to be ascertained with reference to the teachings of the Figures and the specification as a whole.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific implementations, it will be understood that these implementations are not intended to be limiting.

There are many concepts and implementations described and illustrated herein. While certain features, attributes and advantages of the implementations discussed herein have been described and illustrated, it should be understood that many others, as well as different and/or similar implementations, features, attributes and advantages of the present inventions, are apparent from the description and illustrations. As such, the below implementations are merely some possible examples of the present disclosure. They are not intended to be exhaustive or to limit the disclosure to the precise forms, techniques, materials and/or configurations disclosed. Many modifications and variations are possible in light of this disclosure. It is to be understood that other implementations may be utilized and operational changes may be made without departing from the scope of the present disclosure. As such, the scope of the disclosure is not limited solely to the description below because the description of the below implementations has been presented for the purposes of illustration and description.

Importantly, the present disclosure is neither limited to any single aspect nor implementation, nor to any single combination and/or permutation of such aspects and/or implementations. Moreover, each of the aspects of the present disclosure, and/or implementations thereof, may be employed alone or in combination with one or more of the other aspects and/or implementations thereof. For the sake of brevity, many of those permutations and combinations will not be discussed and/or illustrated separately herein.

The present inventors have determined that conventional valves may have a number of deficiencies when used to regulate gas flow in semiconductor manufacturing operations. For instance, some gases used for cleaning and/or processing in process chambers may adversely affect, e.g., corrode, the valves that are used to regulate the flow of such gases and/or other hardware used in semiconductor manufacturing, such as a remote plasma generator used in cleaning gas generation. Additionally, conventional valves may also not be able to effectively isolate hardware from gas that is incompatible with the hardware, as discussed below.

By way of example, during an Atomic Layer Deposition (ALD) process, a chlorine-based process gas may be introduced into a process chamber, while on the other hand, during a cleaning process, a highly reactive cleaning gas, such as atomic and diatomic fluorine, might be introduced into the process chamber. Each of these gases may be compatible with some parts of a semiconductor processing tool and incompatible with other parts of the tool. Fluorine, for instance, is incompatible with stainless steel; chlorine-based gases are incompatible with aluminum.

A valve, such as a conventional bellows-sealed valve, might be used to regulate the flow of fluorine cleaning gas, into the process chamber. In other words, this valve may be fluidically interposed between cleaning gas generation hardware, such as the plasma generator, and the process chamber and may therefore serve to isolate this cleaning gas generation hardware from chlorine-based process gases when the valve is closed during the ALD process. Such isolation may be necessary because one or more parts of the cleaning gas generation hardware may be incompatible with the chlorine-based process gas and it may serve to reduce the amount of dead volume in which the chlorine-based base may collect, e.g., it may prevent such process gases from flowing into the passages/components through which cleaning gas may flow, which may be a dead volume during wafer processing operations. Unfortunately, a traditional stainless steel bellows assembly in a conventional bellows-sealed valve may deteriorate when exposed to fluorine cleaning gas. Moreover, any portion of the valve that is made from a material comprising aluminum and exposed to chlorine may be adversely affected by such exposure to the chlorine-based process gas. However, it should be noted that typically the valve seat, e.g., a portion of the piston that seals against the process chamber, is the portion of the valve that may be exposed to the chlorine-based gas. For example, if the surface of the valve that seals against the process chamber is made of aluminum, then the chlorine-based process gas may interact with that aluminum and cause an undesirable reaction which may lead to the valve ineffectively sealing the process chamber from the cleaning gas generation hardware. Such a reaction may not occur instantly, but rather may occur after multiple exposures over numerous process cycles.

By contrast, apparatuses such as those disclosed herein may be used to both protect a stainless steel bellows assembly from deterioration and effectively isolate aluminum-based hardware, such as cleaning gas generation hardware, from chlorine-based process gases during the ALD process. Returning to the example of the preceding paragraph, a piston assembly in a bellows-sealed valve may include a segment or portion which seals the bellows from gas inside the valve at least when the valve is open; in some implementations, the segment or portion may seal the bellows from gas inside the valve when the valve is open, closed, or transitioning between such states, as described below. The valve may also include a removable seat which includes a seat surface that seals to a gas distribution manifold, which may be composed, at least in part, of a ceramic material, such as alumina. Because ceramic materials may be compatible with both cleaning gas and process gas, e.g., both fluorine-based and chlorine-based gases, the valve may effectively protect cleaning gas generation hardware from process gas flowing in the gas distribution manifold when the valve is closed.

Additional shortcomings of traditional bellows-sealed valves may be ameliorated with some apparatuses disclosed herein. For example, in some implementations, a valve may be constructed to create an improved flow coefficient as described below. Also or alternatively, a valve may be configured to seal directly to a gas distribution manifold such that a dead leg volume between the valve and a gas distribution manifold, with which the valve may be connected, may be minimized.

Figure 1:
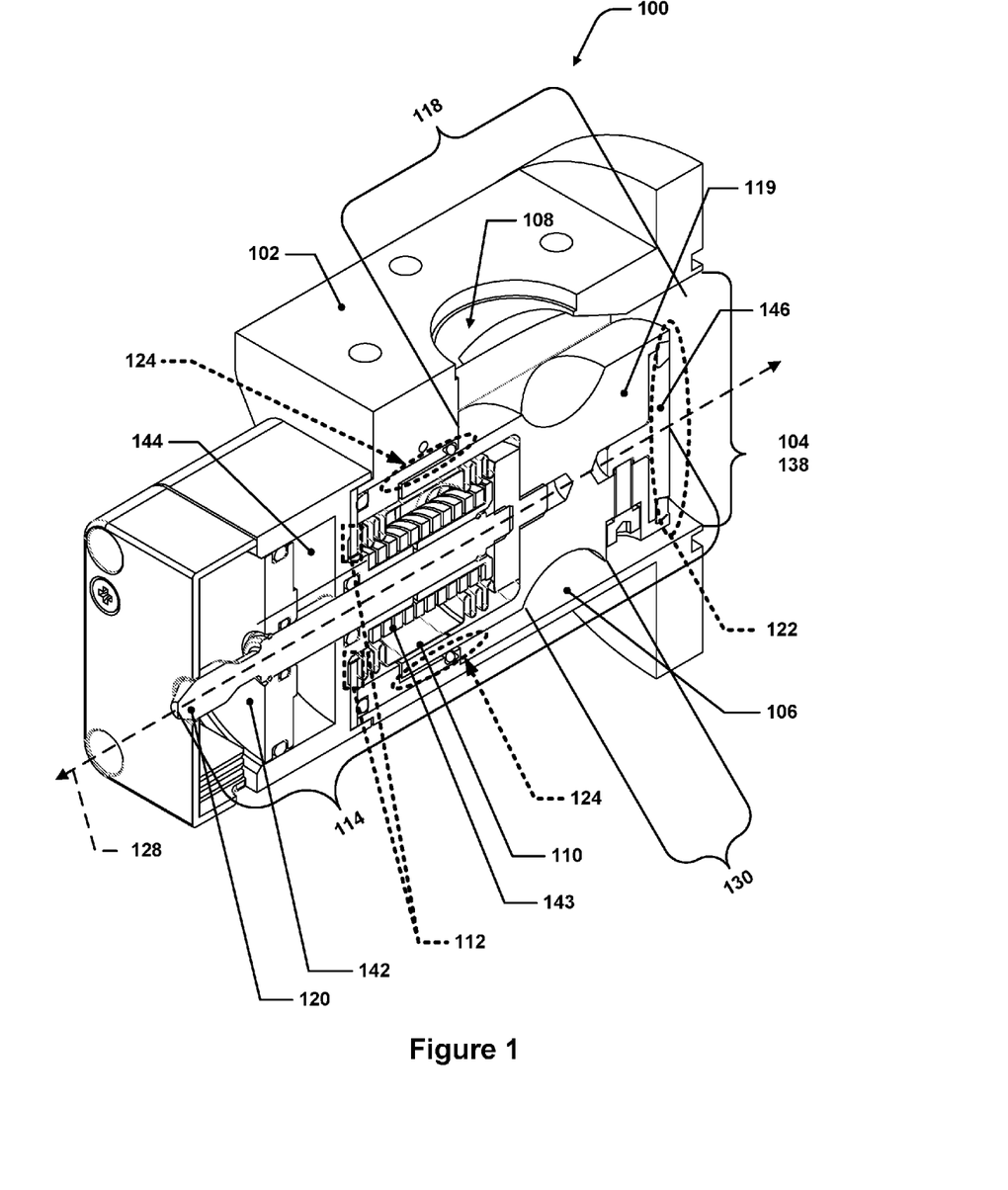
FIG. 1 depicts an isometric cross-sectional view of an example of a gas inlet valve in an open configuration, in accordance with some implementations.
Figure 2:
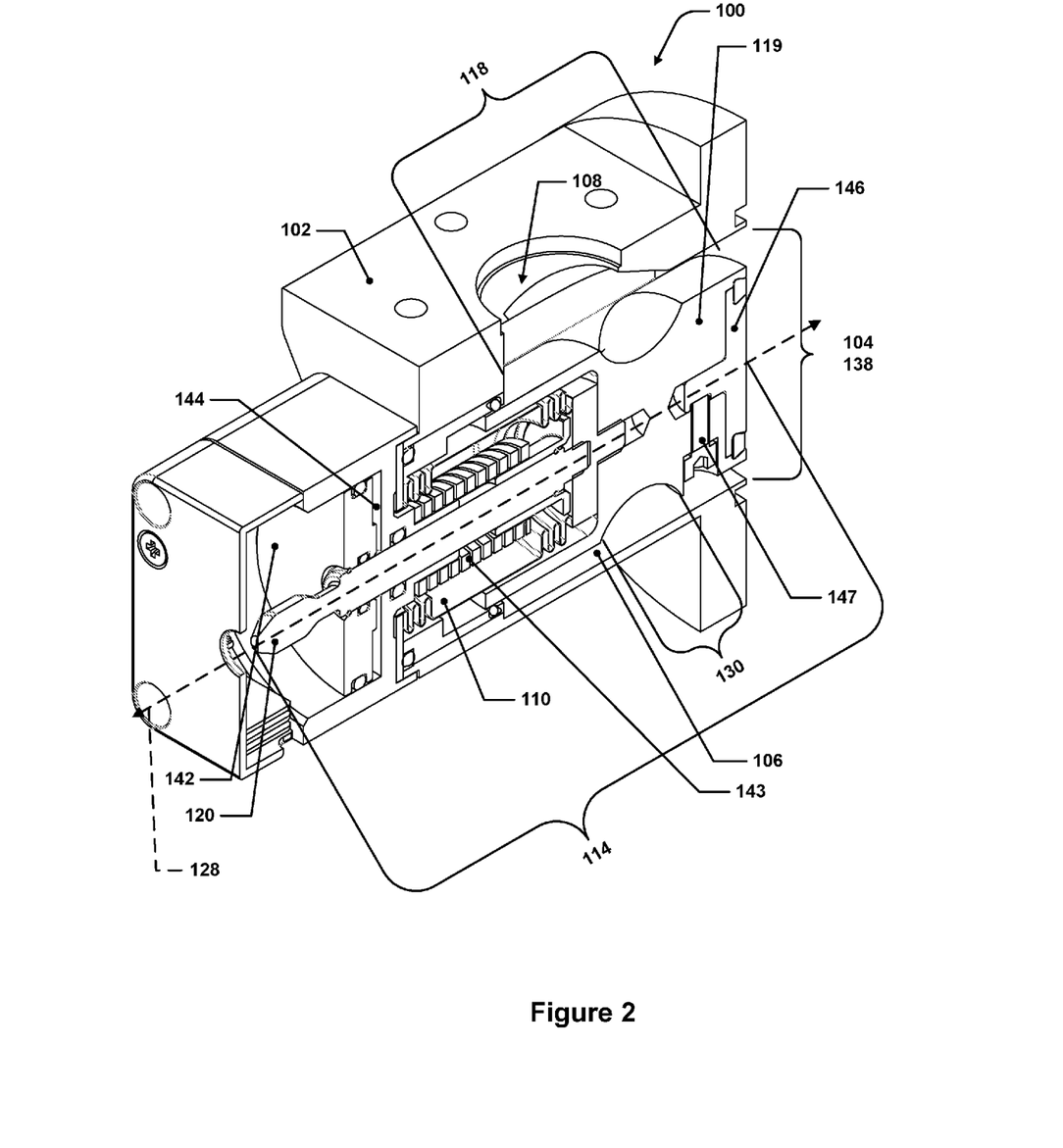
FIG. 2 depicts an isometric cross-sectional view of the gas inlet valve of FIG. 1 in a closed configuration, in accordance with some implementations.
Figure 3:
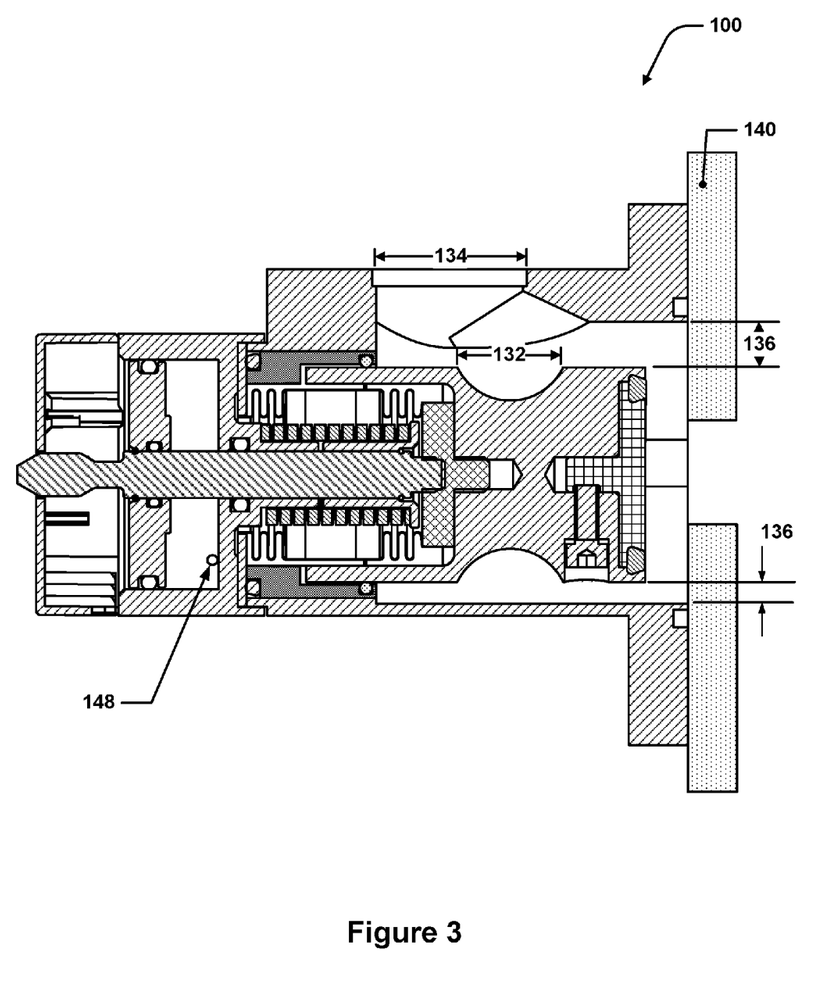
FIG. 3 depicts a side cross-sectional view of the gas inlet valve of FIG. 1 in an open configuration, in accordance with some implementations.
Figure 4:
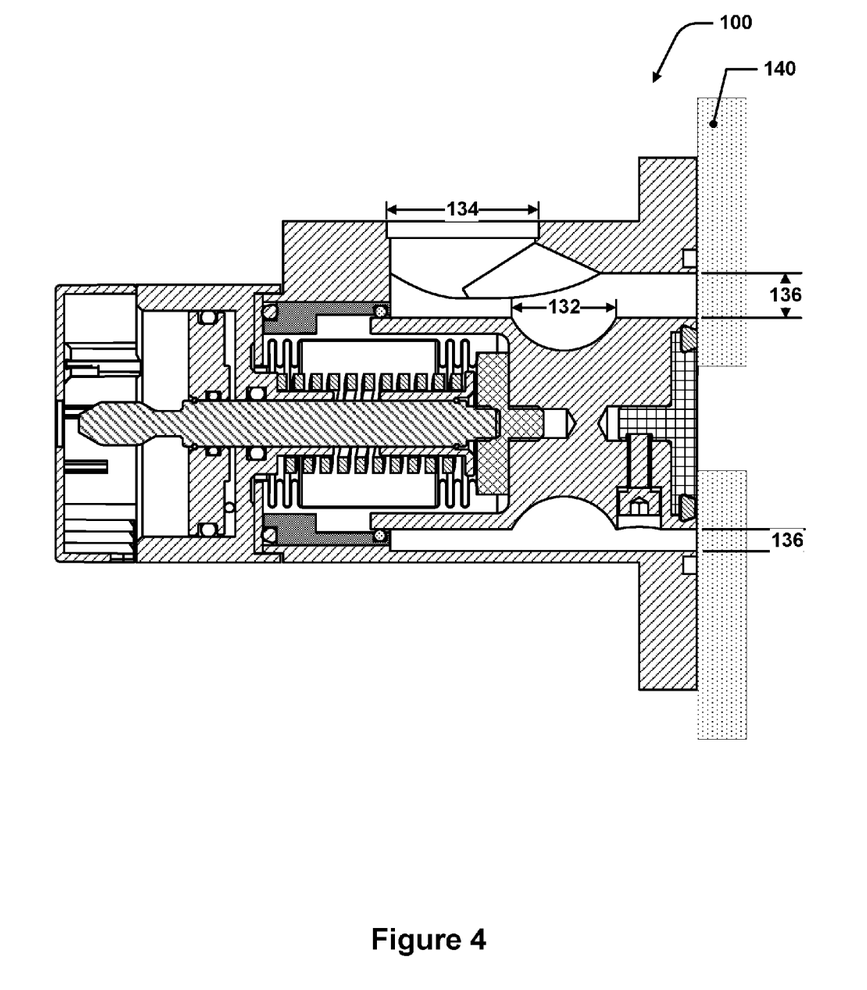
FIG. 4 depicts a cross-sectional view of the gas inlet valve of FIG. 1 in a closed configuration, in accordance with some implementations.
Figure 11:
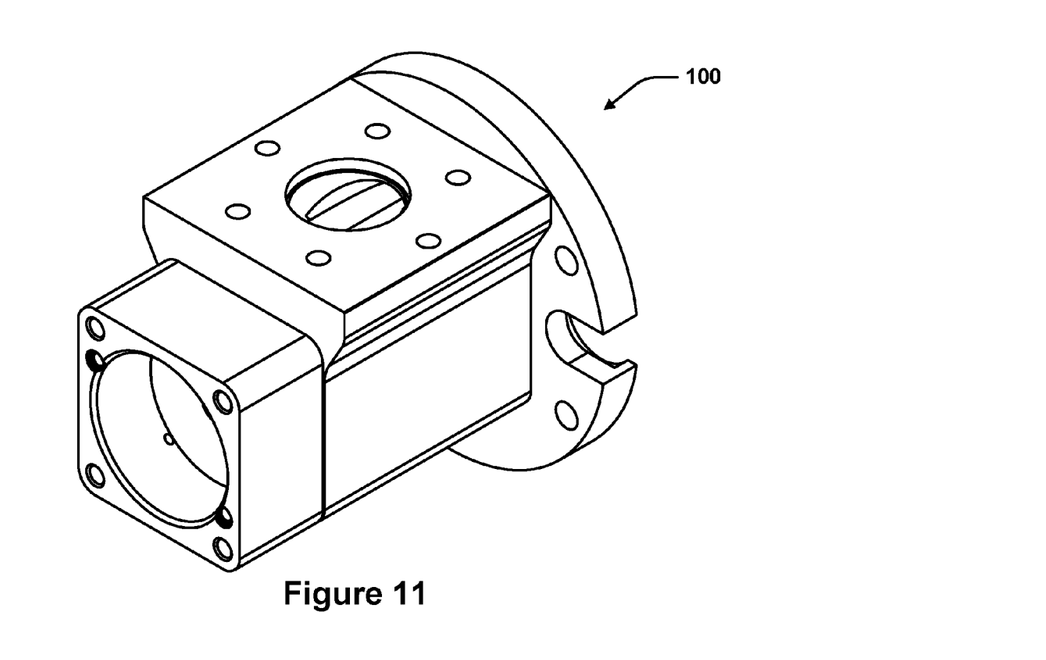
FIG. 11 depicts an isometric view of the example gas inlet valve.
Figure 12:
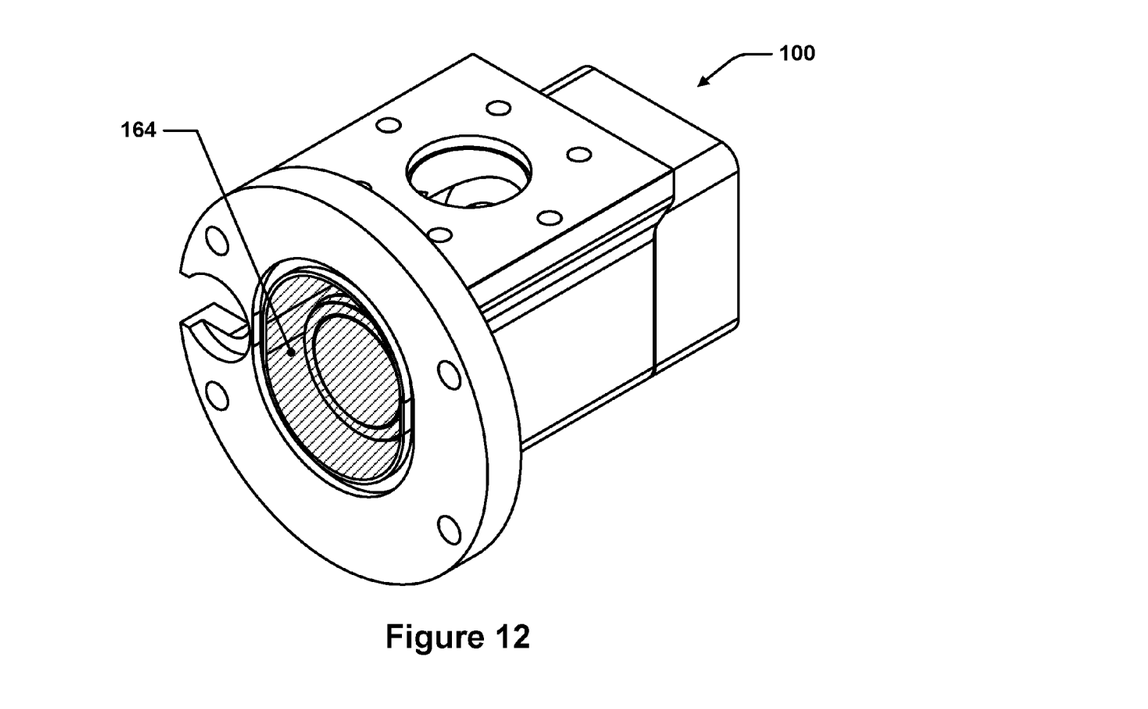
FIG. 12 depicts an off-angle view of the example gas inlet valve.

FIG. 1 depicts an isometric cross-sectional view of an example of a gas inlet valve in an open configuration, in accordance with some implementations. FIG. 2 depicts an isometric cross-sectional view of the gas inlet valve of FIG. 1 in a closed configuration, in accordance with some implementations. FIG. 3 depicts a side cross-sectional view of the gas inlet valve of FIG. 1 in an open configuration, in accordance with some implementations. FIG. 4 depicts a cross-sectional view of the gas inlet valve of FIG. 1 in a closed configuration, in accordance with some implementations. FIG. 11 depicts an isometric view of the example gas inlet valve and FIG. 12 depicts an off-angle view of the example gas inlet valve.

The gas inlet valve 100, of FIGS. 1-4, includes a body 102 with a cavity 104, which may be at least partially bounded by an interior surface 106 of the body 102. The body 102 may be provided as a single contiguous piece or as a multi-part assembly. Gas may flow from a gas source, such as a remote plasma generator, through an inlet port 108, and into the cavity 104. Gas may flow out of the valve 100 through at least a part of an outlet port 164, identified with cross-hatching in FIG. 12, which may be at least partially defined by a bore region 138 (discussed below).

In some implementations, the gas inlet valve 100 may contain a bellows 110 that may have one end sealed to a first portion 112 of the interior surface 106 of the body 102. The composition and construction of the bellows 110 may vary across implementations. For instance, the bellows 110 may be formed or welded and may be composed of a variety of materials such as stainless steel or titanium.

As identified in FIGS. 1 and 2, the gas inlet valve 100 also includes a piston assembly 114, which may be at least partially located within the body 102, may be at least partially located within the cavity 104, and may be movable between an open configuration (shown in FIGS. 1 and 3) and a closed configuration (shown in FIGS. 2 and 4). The piston assembly 114 may include a piston 119 and a rod 120. The rod 120 may be slideably connected with the body 102 and configured to allow the piston 119 to translate along a first axis 128.

As can be seen in FIGS. 1-4, the valve 100 may include a spring 143 that may bias the piston so as to cause it to translate along the first axis 128 and into the closed configuration. The bellows 110 may seal aspects of the valve 100, such as the spring 143 and rod 120, from the cavity 104 to protect such components from fluorine or other cleaning gas.

A variety of mechanisms may be used to cause the piston 119 to translate along the first axis 128. Referring back to FIGS. 1 and 2, the gas inlet valve 100, for instance, may be fluidly driven using a diaphragm 142, which may be connected with the rod 120 and may translate in response to changes in pressure in a pressure chamber 144, causing the rod 120 to slide along the first axis 128. For example, the valve may be caused to open when a fluid, e.g., pressurized gas or liquid, enters the pressure chamber 144 through a pressure chamber port 148 (identified in FIG. 3) thereby causing a pressure increase inside the pressure chamber 144 and exerting a force on the diaphragm 142, thereby causing the diaphragm 142 and the rod 120 to move along the first axis 128. The movement of and the force from the diaphragm 142 may cause a spring 143 to be compressed as the gas inlet valve 100 opens, generating an opposing force to the diaphragm 142, as the rod 120 translates along the first axis 128. The opposing force of the spring may cause a portion of the piston 119 to seal with a surface, such as the surface on which the valve is mounted, and thus cause the valve to be in a "closed" configuration. Alternatively, the piston 119 may be driven by other mechanisms, such as electronically driven by a motor, magnetically driven by a solenoid, or mechanically driven by a motor coupled to a linear drive, etc.

When the gas inlet valve 100 is in the open configuration, gas may flow freely from a gas source through the inlet port 108 and through the cavity 104 of the gas inlet valve 100 and out at least a part of the outlet port 164. On the other hand, when the gas inlet valve 100 is in the closed configuration, a gas source, such as cleaning gas generation hardware, which may be fluidically connected with the inlet port 108, may be protected from process gas flowing in a gas distribution manifold connected with the gas inlet valve 100, as described below.

Figure 5:
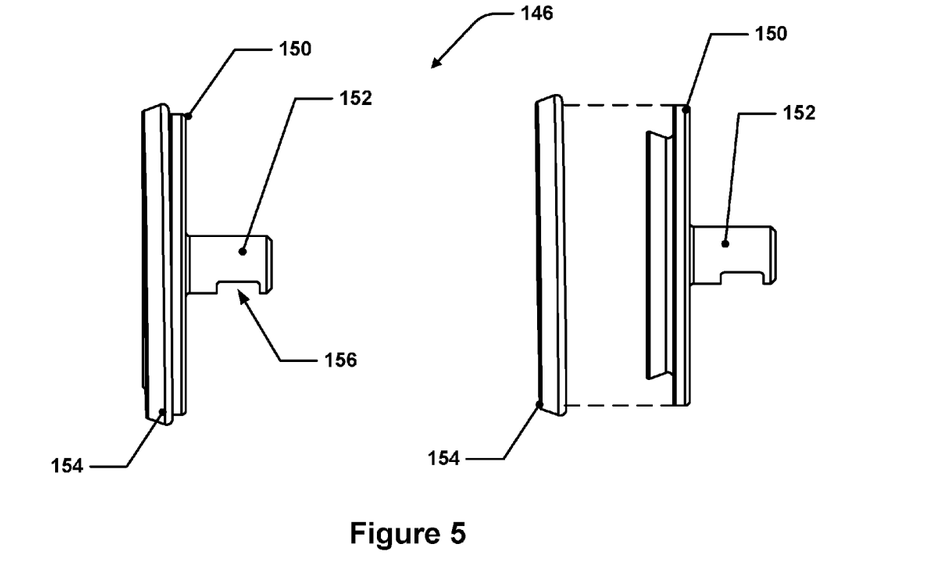
FIG. 5 depicts both a plan view and an exploded view of the removable valve seat.
Figure 6:
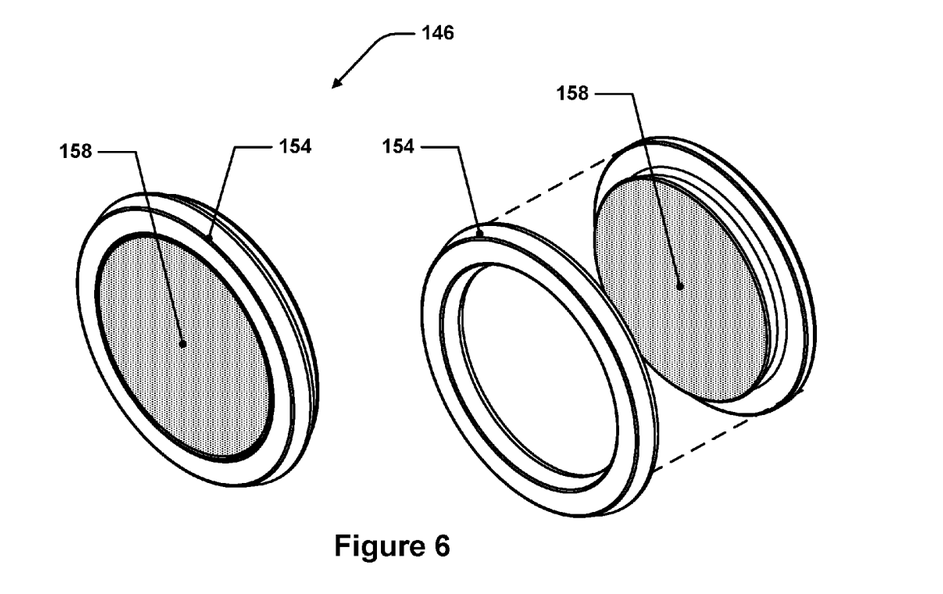
FIG. 6 depicts both an off-angle view and an exploded off-angle view of the removable valve seat.

The piston 119 may also include a removable seat 146 that can be seen in FIGS. 1-4. As shown in FIG. 2, for example, a stem 152 of the removable seat 146 has been inserted into a cavity (not identified) of the piston 119 and secured in place by a set screw 147. The removable seat 146 may be configured to be installed in and removed from the piston 119 in a non-destructive manner. FIG. 5 depicts both a plan view and an exploded view of the removable valve seat while FIG. 6 depicts both an off-angle view and an exploded off-angle view of the removable valve seat. As can be seen in FIG. 5, the removable valve seat 146 includes a seat body 150 with the stem 152, and a first seal 154. The right side of FIG. 5 shows that the first seal 154 may be removable and/or affixed to the seat body 150. The stem 152 may include a recess or a flat 156 that may be used to secure the removable seat into the piston 119. As can be seen in FIG. 6, the seat body 150 of the removable seat 147 may also include a seal face 158 that is identified with shading. The first seal 154 may extend around and/or encircle the seal face 158, when viewed at an angle perpendicular to the face. The seat body 150 may be made from a ceramic material, such as alumina. Alternate implementations, e.g., valves that may not be used in such harsh chemical environments, may use seat bodies 150 that are made from other materials, e.g., aluminum or stainless steel, permitting a single valve body to be used with a variety of different gases depending on the particular seat body material that is selected. As discussed herein, the removable seat 146, including the first seal 154 and the seal face 158, may be an interface of the valve that seals with other surfaces or hardware of the semiconductor processing tool. Such a seal may prevent liquid and/or gas from flowing through the outlet port and into or out of the cavity 104.

During normal operations, the removable seat 146 may be exposed to both cleaning gases and process gases. Given its composition of ceramic material, it is compatible with both gases, but may still suffer wear, tear, and or deterioration, including to the first seal 154. Accordingly, the present inventors have intended that the removable seat 146 and/or the first seal 154 may be removed from the piston 119 and another removable seat 146 and/or first seal 154 may be installed into the piston 119. For instance, the removable seat 146 may be removed and replaced entirely, or the removable seat 146 may be removed and a new first seal 154 may be placed on the same removable seat 146, which may then be reinstalled into the piston 119. Such a removal and installation may occur when the removable seat 146 and/or first seal 154 has degraded, or been damaged, past its expected operability (e.g., it does not seal effectively). This provides an efficient and inexpensive way to replace part of the valve 100 instead of replacing the entire valve 100.

As discussed, the stem 152 of the removable seat 146 may be inserted into a cavity in the piston 119, which may have a larger recessed area around the stem-receiving cavity that may receive the removable seat 146; this larger recessed area may have an interior sidewall that forms part of the gland that receives the first seal 154. The gland that receives the first seal 154 may thus have opposing sidewalls that are each formed by different materials—the transition between such materials may occur at the base/bottom of the gland, as is evident from the Figures, such that the seal also seals the material transition. In implementations in which the piston 119 and the removable seat 146 are made from the same material, of course, the gland sidewalls will be the same material. In valves featuring incompatible materials isolation, e.g., valves with ceramic removable seats, the inner wall of the seal gland may be ceramic, and the outer wall of the seal gland may be made from the material of the piston 119, e.g., an aluminum alloy. Thus, the material transition between the aluminum and the ceramic occurs at the seal, thereby maintaining the incompatible material isolation across the seal boundary.

Figure 7:
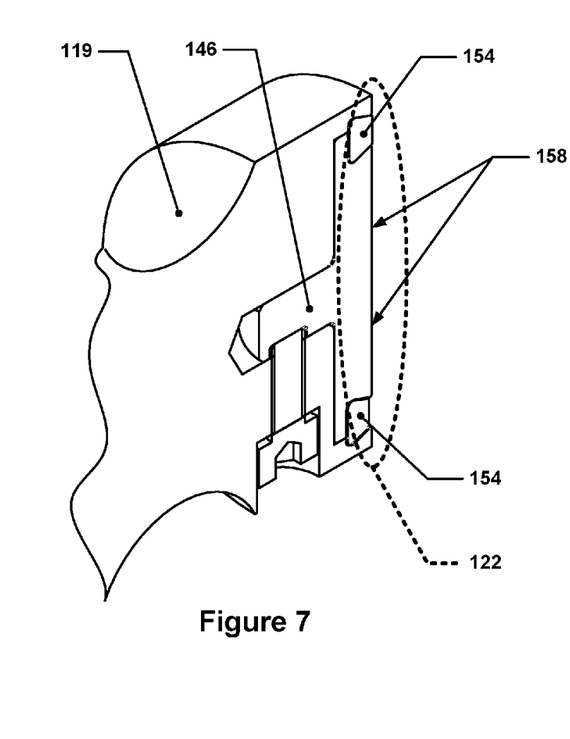
FIG. 7 depicts a magnified portion of the valve in FIG. 1 that includes a first seal interface.

Referring back to FIG. 1, the piston 119 may include more than one sealing interface. For example, the piston 119 may include a first seal interface 122, generally indicated within the dashed ellipses labeled 122 in FIG. 1, that may seal a portion of the piston 119, which includes the seal face 158 and first seal 154 (both of which are not identified in FIG. 1) of the removable seat 146, to a surface, and a second seal interface 124, generally indicated within the dashed ellipses labeled 124 in FIG. 1, that may seal the bellows 110 from the cavity 104. Each of the sealing interfaces may include a seal and one or more surfaces of the valve. FIG. 7 depicts a magnified portion of the valve in FIG. 1 that includes the first seal interface. As can be seen, the first valve interface 122 includes the first seal 154 and seal face 158 of the removable seat 146. The first seal 154 and/or the seal face 158 may be the components of the piston 119 that seal to another surface such that no fluid may flow into or out of the valve.

The manner in which the first seal interface 122 functions may vary across implementations. For instance, the first seal interface 122 may be configured to seal against the body 102 of the gas inlet valve 100. Alternatively, the gas inlet valve 100 may be mounted directly to a mounting surface, such as an inlet of a gas distribution manifold. In this case, the first seal interface 122 may be configured to seal directly against the mounting surface to which the valve 100 may be mounted. The implementation shown in FIGS. 1 through 4 follows this latter approach (the mounting surface to which the valve 100 may be mounted is shown in FIGS. 3 and 4). As can be seen in FIGS. 3 and 4, the first seal interface 122 is sized larger than an opening in the mounting surface which may enable the sealing described herein.

Figure 8:
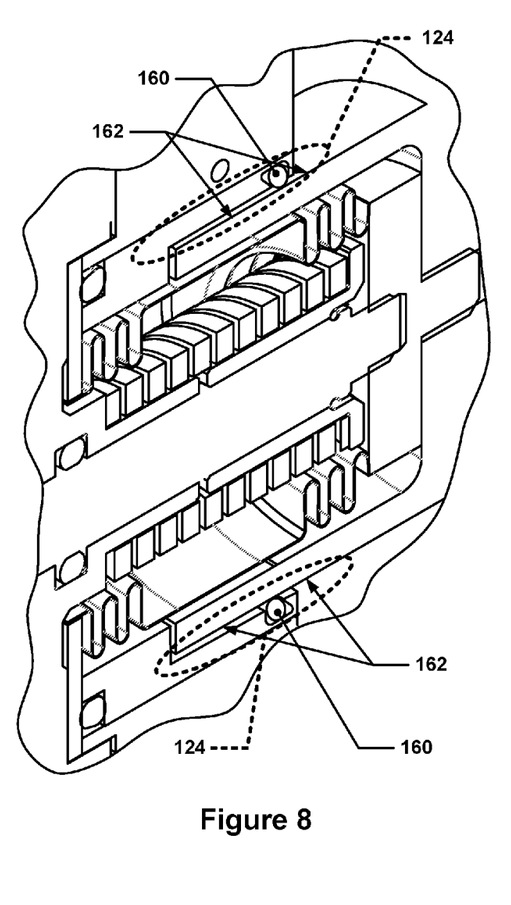
FIG. 8 depicts a magnified portion of the valve in FIG. 1 that includes a second seal interface.

FIG. 8 depicts a magnified portion of the valve in FIG. 1 that includes the second seal interface. The second seal interface 124 includes a second seal 160 that is located in a notch (not identified) in the body 102 of the valve 100 that seals to a portion 162 of the piston 119, e.g., an annular surface. The piston 119 is configured such that the portion 162 of the piston 119 seals with the second seal 160, thereby sealing a portion of the cavity 104 containing the bellows 110 off from another portion 118 (also identified in FIGS. 1 and 2) of the cavity in fluidic communication with the inlet port 108 at all times, including when the valve is in the open configuration, closed configuration, and transitioning between such configuration. This protects the bellows 110 from gas that may flow through the valve, such as cleaning gas and/or process gas.

The orientation of such sealing interfaces may vary across implementations. For instance, as shown in FIGS. 1-4, the first seal interface 122 and the second seal interface 124 face in different directions with the first seal interface 122 substantially perpendicular, e.g., 90+/−10 degrees, to the first axis 124 and the second seal interface 124 that is substantially parallel, e.g. within +/−10 degrees of parallel, to the first axis 128. As one having skill in the art may appreciate, the geometric orientations of such seal interfaces may vary depending on the orientation of components of the gas inlet valve 100 as well as apparatuses with which the gas inlet valve 100 may be connected.

In some implementations, the piston 119 may be configured to improve the flow coefficient of the gas inlet valve 100. In some such implementations, the configuration of the hardware on which the valve is installed may limit the allowable size of the valve which may therefore undesirably limit or restrict flow through the valve. Thus, the present inventors have configured the valve to increase the flow of gas through the valve in a way that does not increase the packaging envelope of the valve so that the valve does not adversely affect such gas flow. Such configuration(s) may include, for instance, making a circumferential groove in the piston, placing the piston off-center within cavity of the valve, and/or configuring the valve to mount directly to a surface. FIGS. 1-4 depict, for example, the piston 119 including a circumferential groove 130 (identified in FIGS. 1 and 2). The shape of the circumferential groove 130 may vary across implementations and may be configured to allow a high flow rate of gas through the valve 100. For example, the circumferential groove 130 may have a semi-circular shape as shown in FIGS. 1-4, or may have other cross-section shapes, such as rectangular or V-shaped shapes. The circumferential groove 130 may be positioned on the piston 119 such that when the piston assembly is in the open configuration of FIGS. 1 and 3, the circumferential groove is substantially aligned with the inlet port 108 along the first axis 128 such that gas flowing into the inlet port 108 may enter the circumferential groove 130 without being subject to significant flow restriction. For instance, as depicted in FIGS. 3 and 4, a width of the circumferential groove 132 may be generally equivalent, e.g., within 15%, to a maximum diameter of the inlet port 134. Thus, as gas flows into inlet port 108, the gas may flow around the piston 119 via the circumferential groove 132 with little flow resistance before proceeding to flow along a direction parallel to the first axis 128, thereby improving the efficiency of gas flow through the gas inlet valve 100.

Figure 9:
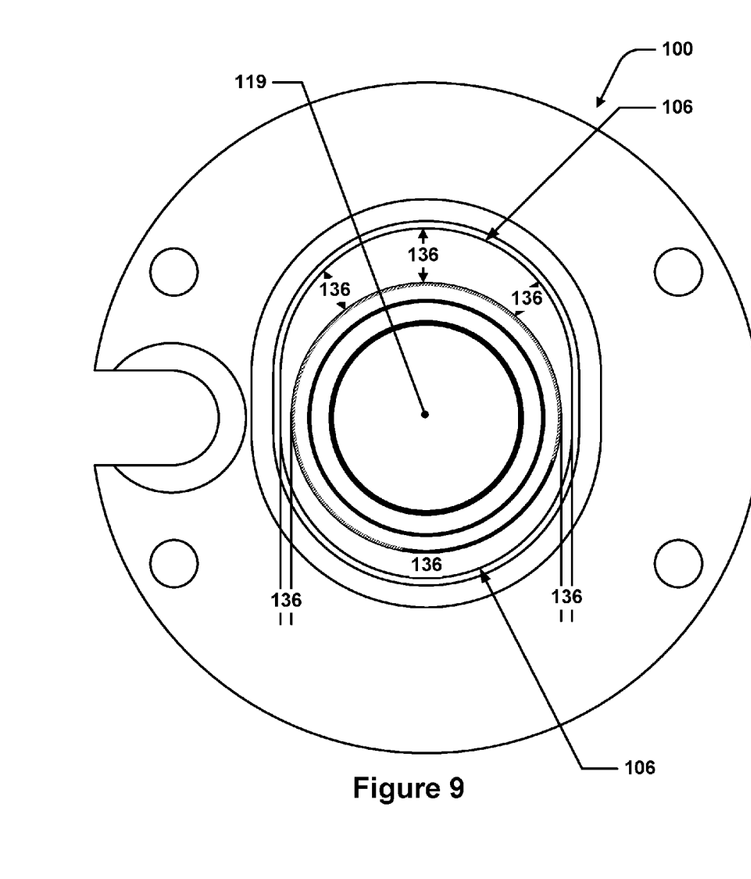
FIG. 9 depicts a plan end-view of the gas inlet valve of FIG. 1.
Figure 10:
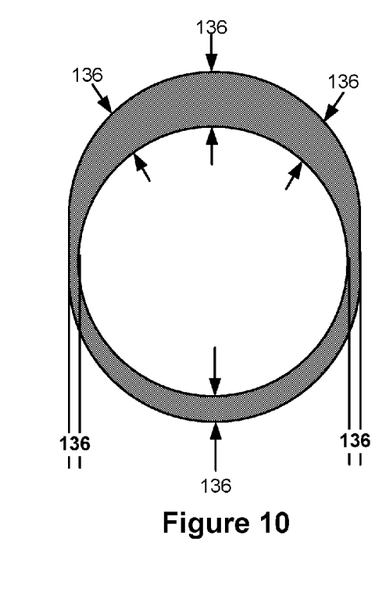
FIG. 10 depicts a representational area of a portion of the valve in FIG. 9, in accordance with some implementations.

Also or alternatively, the placement of the piston 119 within a bore region 138 of the interior surface 106 of the body 102 may be configured to improve the flow coefficient of the gas inlet valve 100. One example of such a configuration may be seen in FIGS. 3, 4, 9, and 10; FIG. 9 depicts a plan end-view of the gas inlet valve of FIG. 1 and FIG. 10 depicts a representational area of a portion of the valve in FIG. 9, in accordance with some implementations. As can be seen in FIGS. 3 and 4, the piston 119 may be offset from the interior surface 106 of the body 102 in a plane perpendicular to the first axis 128 by a minimum distance 136 that may be varied about the perimeter of the piston 119. In other words, the piston 119 may be further from the side of the interior surface 106 of the body 102 containing the inlet port 108 than the side opposite the inlet port 108, providing extra volume for gas flow near the inlet port 108 where pressure may be greatest. In FIG. 9, the minimum distance 136, i.e., the offset of the piston 119 from the interior surface 106, can be seen while in FIG. 10, the representative area of the minimum distance 136, e.g., the area between the piston perimeter (not identified) and the interior surface 106, in a plane perpendicular to the first axis 128 (not identified), is shown with shading.

A shape of the piston 119, including the removable seat 146, and the bore region 138 may also vary across implementations. For example, the piston 119, as well as the removable seat 146, may have a circular cross-sectional shape in a plane perpendicular to the first axis 128, and the bore region of the interior surface of the body 138 may have a variety of cross-sectional shapes in the plane perpendicular to the first axis 128, such as the obround cross-sectional shape shown in FIGS. 1, 2, 9, and 12. Some additional examples of potential cross-sectional shapes might include: a circular cross-sectional shape, an ovular cross-sectional shape, an elliptical cross-sectional shape, etc.

In some implementations, the gas inlet valve 100 may also include a seal plate 140 of FIGS. 3 and 4. The seal plate 140 may have an exterior surface 141, which may be composed primarily of a ceramic material. As such, the seal plate 140 may be compatible with both cleaning gas, such as fluorine and chlorine-based process gas. Also or alternatively, the seal plate 140 may be configured to seal directly to a gas distribution manifold to reduce dead leg volume between the gas inlet valve 100 and the gas distribution manifold as compared to conventional valves.

Figure 13:
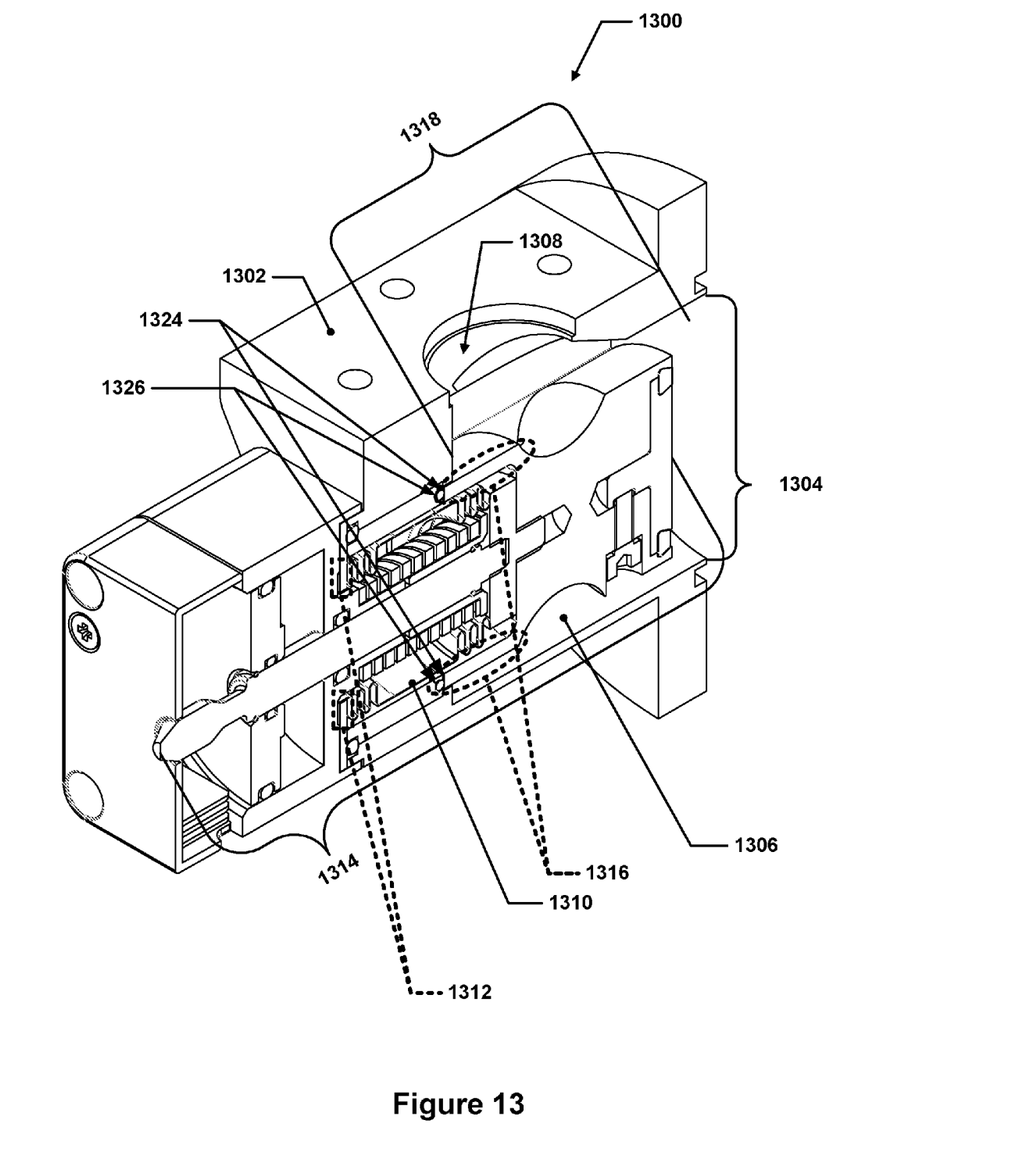
FIG. 13 depicts an isometric cross-sectional view of an example of a gas inlet valve was a different second seal interface in an open configuration, in accordance with some implementations.
Figure 14:
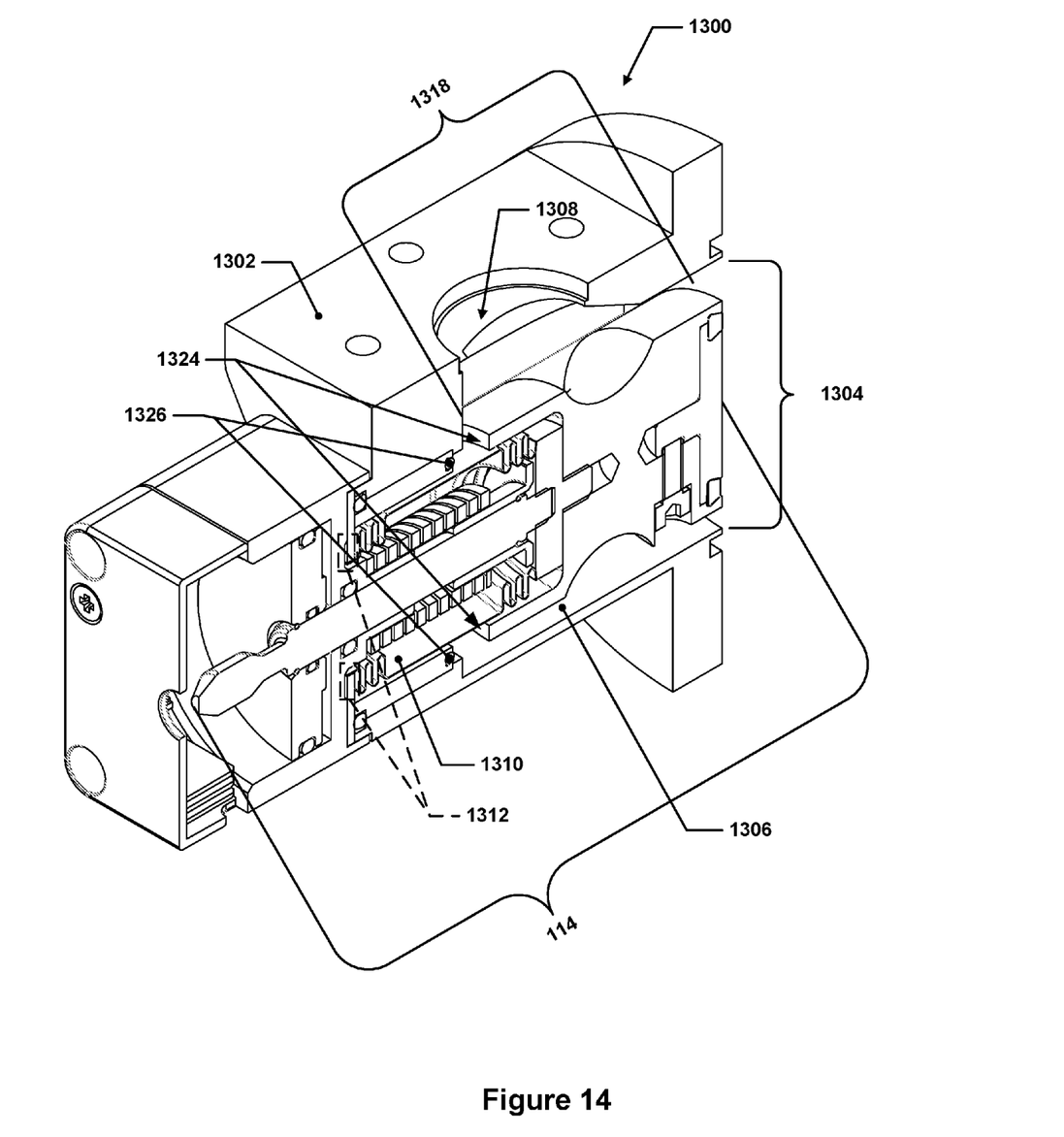
FIG. 14 depicts an isometric cross-sectional view of the gas inlet valve of FIG. 13 in a closed configuration, in accordance with some implementations.
Figure 15:
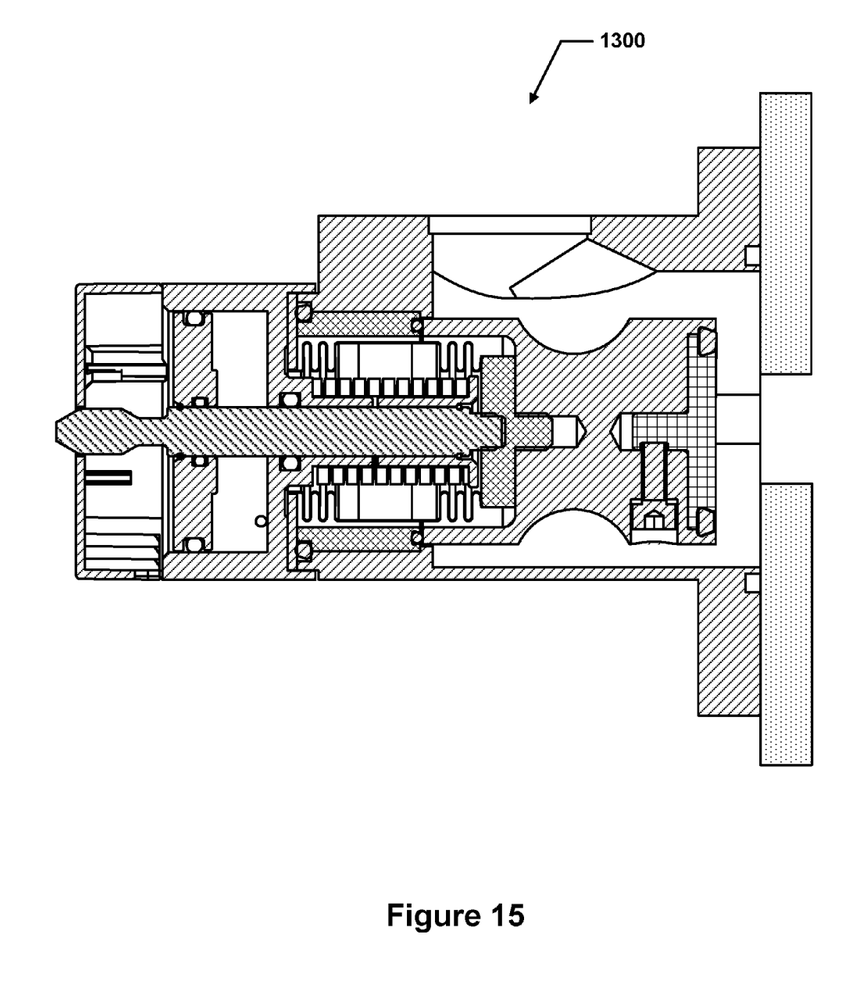
FIG. 15 depicts a side cross-sectional view of the gas inlet valve of FIG. 13 in an open configuration, in accordance with some implementations.
Figure 16:
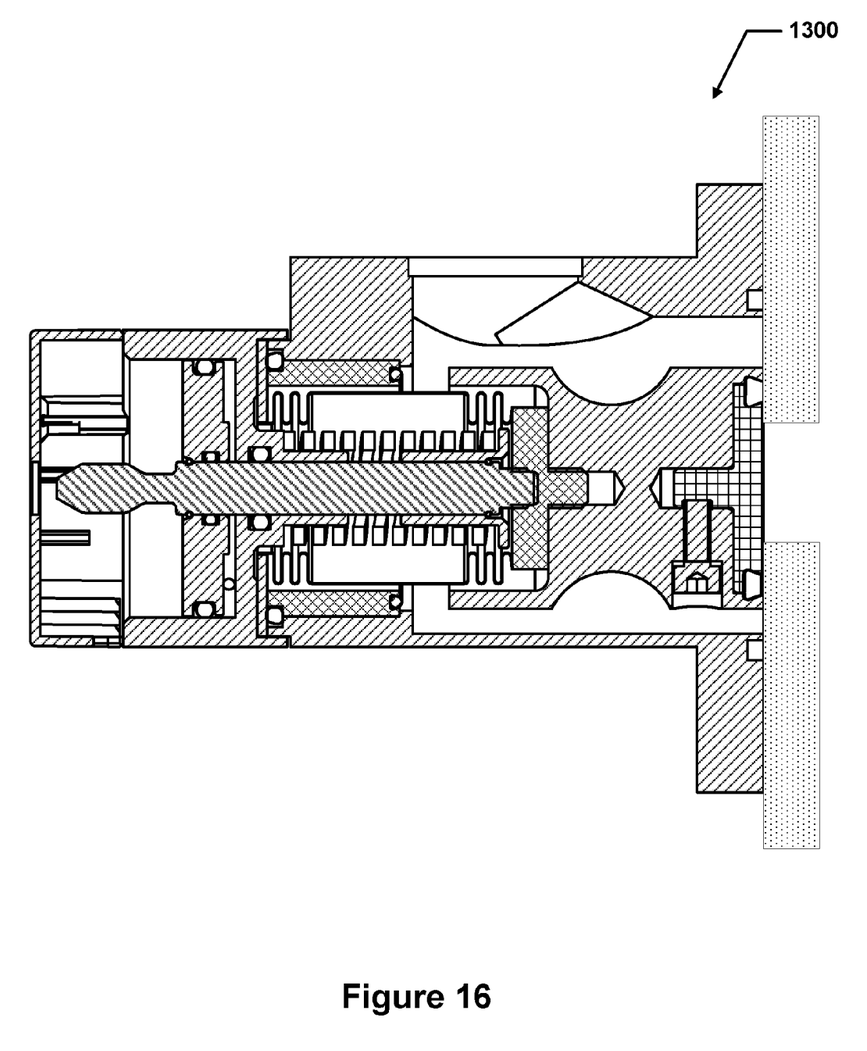
FIG. 16 depicts a cross-sectional view of the gas inlet valve of FIG. 13 in a closed configuration, in accordance with some implementations.

In some other embodiments, the second seal interface may be configured differently than described above. FIG. 13 depicts an isometric cross-sectional view of an example of a gas inlet valve was a different second seal interface in an open configuration, in accordance with some implementations. FIG. 14 depicts an isometric cross-sectional view of the gas inlet valve of FIG. 13 in a closed configuration, in accordance with some implementations. FIG. 15 depicts a side cross-sectional view of the gas inlet valve of FIG. 13 in an open configuration, in accordance with some implementations. FIG. 16 depicts a cross-sectional view of the gas inlet valve of FIG. 13 in a closed configuration, in accordance with some implementations.

As mentioned above, the piston assembly 1314 may isolate the bellows 1310 from gas flowing through the gas inlet valve 1300 when in the open configuration. For example, when the piston assembly 1314 is in the open configuration of FIGS. 13 and 15, a portion 1316 of the piston assembly 1314 may seal a portion of the cavity 1304 containing the bellows 1310 off from another portion 1318 of the cavity in fluidic communication with the inlet port 1308. For example, a second seal interface 1324 on the piston 1319 may be configured to seal against a second portion 1326 of the interior surface 1306 of the body 1302. Additionally, as stated above, the bellows 1310 may have one end sealed to a first portion 1312 of the interior surface 1306 of the body 1302. Accordingly, if the piston assembly 1314 is in the open configuration of FIGS. 13 and 15, the bellows 1310 may be protected from any exposure to cleaning gas flowing into the gas inlet valve 1300 through the inlet port 1308.

Alternatively, when the piston assembly 1314 is in the closed configuration of FIGS. 14 and 16, the portion of the cavity 1304 containing the bellows 1310 may not be sealed off from the other portion 1318 of the cavity 1304 that is in fluidic communication with the inlet port 1308.

Unless the context of this disclosure clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also generally include the plural or singular number respectively. When the word "or" is used in reference to a list of two or more items, that word covers all of the following interpretations of the word: any of the items in the list, all of the items in the list, and any combination of the items in the list. The term "implementation" refers to implementations of techniques and methods described herein, as well as to physical objects that embody the structures and/or incorporate the techniques and/or methods described herein. Unless otherwise specified, the term "substantially" refers to within +/−5% of the value indicated. For example, "substantially parallel" means +/−5% of the angular range between 0° and 90°.

What is claimed is:

1. A valve configured to regulate gas flow to a semiconductor manufacturing apparatus, the valve comprising:
    a body, the body including:
        a cavity partially or fully bounded by an interior surface of the body, and
        at least one inlet port, wherein the at least one inlet port is fluidically connected with the cavity;
    a bellows sealed to a first portion of the interior surface of the body; and
    a piston assembly partially or fully located within the body and movable between an open configuration and a closed configuration, wherein the piston assembly includes:
        a piston, the piston including:
            a first seal interface, and
            a second seal interface configured to seal against a second portion of the interior surface of the body to protect the bellows from exposure to process gases introduced into the cavity via the at least one inlet port when the piston assembly is in at least the open configuration; and a rod, wherein:
when the piston assembly is in at least the open configuration, a portion of the piston assembly seals a portion of the cavity containing the bellows off from another portion of the cavity in fluidic communication with the at least one inlet port,
the bellows seals the rod from fluidic communication with the second seal interface,
the rod is slideably connected with the body and configured to allow the piston to translate along a first axis,
the first seal interface is substantially perpendicular to the first axis, and
a center axis of the piston is parallel to and offset from a center axis of the cavity in a direction perpendicular to the first axis.

2. The valve of claim 1, wherein:
when the piston assembly is in the closed configuration, the portion of the cavity containing the bellows is not sealed off from the another portion of the cavity that is in fluidic communication with the at least one inlet port,
the bellows seals the rod from fluidic communication with the at least one inlet port,
the first seal interface and the second seal interface face in opposite directions, and
the first seal interface and the second seal interface are substantially perpendicular to the first axis.

3. The valve of claim 1, wherein:
when the piston assembly is in the open and in the closed configurations, the portion of the piston assembly seals a portion of the cavity containing the bellows off from the another portion of the cavity in fluidic communication with the at least one inlet port, and
the second seal interface is further configured to seal against the second portion of the interior surface of the body when the piston assembly is in the open configuration, in the closed configuration, and between the open and closed configurations.

4. The valve of claim 3, wherein the second seal interface is substantially parallel to the first axis.

5. The valve of claim 3, wherein the piston further comprises a removable seat that includes the first seal interface.

6. The valve of claim 5, wherein the removable seat is configured to be removed from the piston.

7. The valve of claim 5, wherein:
the removable seat includes a first seal and a seat body with a face, and
the face and the first seal are configured to seal against one or more of: the body and a mounting surface to which the valve is mounted.

8. The valve of claim 7, wherein:
the seat body is comprised of a ceramic, and
the piston is comprised of a material selected from the group consisting of: aluminum and an aluminum alloy.

9. The valve of claim 8, wherein:
the removable seat is inserted into a cavity of the piston that includes a recessed area that is sized larger than a diameter of the removable seat,
the piston and the removable seat, when assembled, form a gland that receives the first seal,
a first sidewall of the gland is provided by the piston and is made of a material selected from the group consisting of: aluminum and aluminum alloy, and a second sidewall of the gland is provided by the removable seat and is made of a ceramic material.

10. The valve of claim 7, wherein the first seal encircles the face when viewed from an angle perpendicular to the face.

11. The valve of claim 1, wherein the first seal interface is configured to seal against the body.

12. The valve of claim 1, wherein the first seal interface is configured to seal against a mounting surface wherein the valve is mounted to the mounting surface.

13. The valve of claim 2, wherein the piston includes a circumferential groove.

14. The valve of claim 13, wherein the circumferential groove has a semi-circular cross-sectional shape.

15. The valve of claim 13, wherein the circumferential groove is positioned on the piston such that when the piston assembly is in the open configuration, the groove is substantially aligned with the at least one inlet port along the first axis.

16. The valve of claim 13, wherein a width of the circumferential groove is within 15% to a maximum diameter of the at least one inlet port.

17. The valve of claim 1, wherein:
the piston has a circular cross-sectional shape in a plane perpendicular to the first axis, and
a bore region of the interior surface of the body has a cross-sectional shape in the plane perpendicular to the first axis selected from the group consisting of: a circular cross-sectional shape, an elliptical cross-sectional shape, and an obround cross-sectional shape.

18. The valve of claim 1, further comprising a seal plate with an exterior surface, wherein:
the exterior surface is comprised of a ceramic material, and
the piston assembly is configured to seal to the seal plate.

19. The valve of claim 18, wherein the seal plate is configured to seal directly to a gas distribution manifold.

20. The valve of claim 1, wherein the bellows is comprised of stainless steel.

21. A valve configured to regulate gas flow to a semiconductor manufacturing apparatus, the valve comprising:
a body, the body including:
a cavity at partially or fully bounded by an interior surface of the body, and
at least one inlet port, wherein the at least one inlet port is fluidically connected with the cavity;
a bellows sealed to a first portion of the interior surface of the body; and
a piston assembly partially or fully located within the body and movable between an open configuration and a closed configuration, wherein the piston assembly includes:
a piston, the piston including:
a first seal interface, and
a second seal interface configured to seal against a second portion of the interior surface of the body to protect the bellows from exposure to process gases introduced into the cavity via the at least one inlet port when the piston assembly is in at least the open configuration; and
a rod, wherein:
when the piston assembly is in at least the open configuration, a portion of the piston assembly seals a portion of the cavity containing the bellows off from another portion of the cavity in fluidic communication with the at least one inlet port, the bellows seals the rod from fluidic communication with the second seal interface, the rod is slideably connected with the body and configured to allow the piston to translate along a first axis, the first seal interface is substantially perpendicular to the first axis, the piston has a circular cross-sectional shape in a plane perpendicular to the first axis, and a bore region of the interior surface of the body has a cross-sectional shape in the plane perpendicular to the first axis selected from the group consisting of: an elliptical cross-sectional shape and an obround cross-sectional shape.

* * * * *